Feb. 26, 1929.  
W. NIELSEN  
1,703,355  
DOUBLE WINDSHIELD  
Filed Sept. 1, 1927
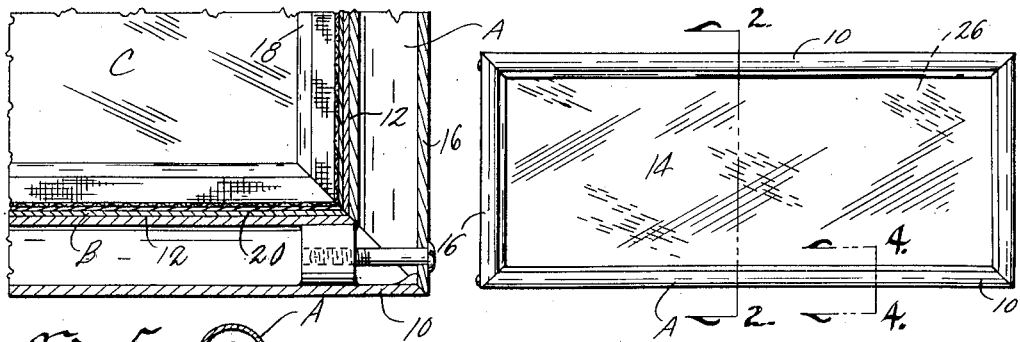
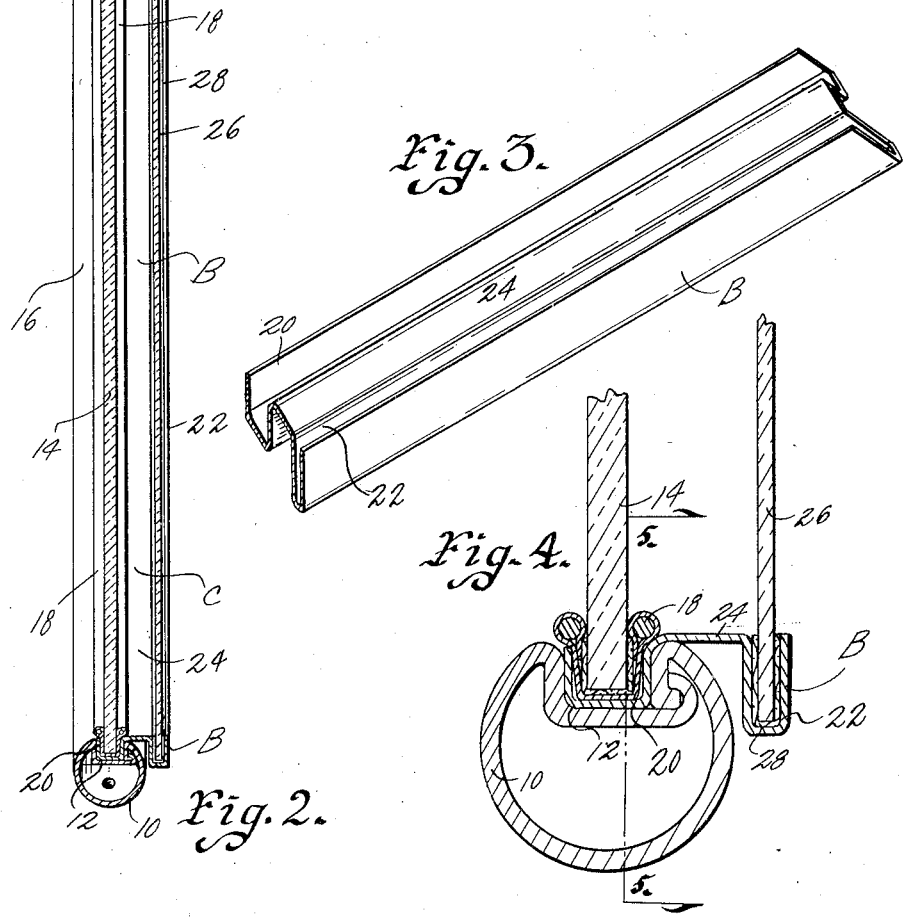
Inventor  
William Nielsen  
by Bair & Freeman Attorneys
Witness  
Vinton Read Patented Feb. 26, 1929.

1,703,355

UNITED STATES PATENT OFFICE.

WILLIAM NIELSEN, OF FORT DODGE, IOWA.

DOUBLE WINDSHIELD.

Application filed September 1, 1927. Serial No. 216,902.

The object of my invention is to provide a double wind shield of simple, durable, and comparatively inexpensive construction whereby a dead air chamber is formed between the normal wind shield of an automobile and the auxiliary wind shield which I mount upon the normal wind shield so that frost and the like will be prevented from collecting on the wind shield and obscure the vision therethrough.

More particularly it is my object to provide a means of mounting the auxiliary wind shield upon the ordinary wind shield of an automobile so that at certain seasons of the year the auxiliary wind shield may be removed and the ordinary wind shield left in place, the auxiliary wind shield being mounted by means of a double channel frame which coacts with the ordinary wind shield and is retained in position by the ordinary wind shield glass.

With these and other objects in view, my invention consists in the construction, arrangement and combination of the various parts of my double wind shield, whereby the objects contemplated are attained, as hereinafter more fully set forth, pointed out in my claims, and illustrated in the accompanying drawings, in which:

Figure 1 is a front elevation of my wind shield.

Figure 2 is a sectional view taken on the line 2—2 of Figure 1.

Figure 3 is a perspective view of a portion of the channel frame used for supporting and mounting the auxiliary wind shield in position.

Figure 4 is an enlarged detail sectional view taken on the line 4—4 of Figure 1; and Figure 5 is a detail sectional view through one corner of the wind shield frame illustrating the manner of hooking the corners together for holding the wind shield glass in place.

In the accompanying drawings I have used the reference character A to indicate generally a rectangular frame formed of sheet metal rolled to form a tube-like element 10 having channel grooves 12 arranged therein. The entire frame A is rectangular in outline and the channel grooves 12 of the four sides of the frame all face each other so as to provide means for receiving the wind shield glass 14 which may be referred to as the ordinary wind shield element. The frame member A may be formed of separate side and end pieces or may be formed of a pair of pieces with one of the end members removable.

In wind shields of this type normally one of the end elements as at 16 is removable from the rest of the wind shield frame so that the glass 14 may be slid into position and by placing the end 16 over the free end of the glass and by securing the end 16 to the remainder of the frame as shown in Figure 5 of the drawings, the wind shield glass will be held in proper position. The glass 14 is normally received in the channel grooves 12 of the frame A.

Any suitable binder strip 18, preferably of fabric, is received within the grooves 12 and in turn the wind shield 14 has its sides and ends received in the binder 18. My attachment or means whereby an auxiliary wind shield can be mounted upon the normal wind shield includes a frame, rectangular in outline and corresponding in size substantially to the frame A. The auxiliary wind shield is mounted in this frame which may be referred to as an auxiliary frame B. The frame B is formed of sheet metal having a pair of channel shaped grooves 20 and 22 therein each of which open in the same direction. The two channel shaped grooves 20 and 22 are spaced apart by means of a flat spacing strip 24. The channel groove 20 is comparatively large relative to the groove 22 and is of such size as to fit into the channel grooves 12 of the frame A.

An auxiliary wind shield glass 26 having tape or the like 28 around its edges is received within the channel groove 22 of the frame B.

It will be noted that the normal wind shield 14 is spaced from the auxiliary wind shield 26 and the space in between forms a dead air compartment C. The frame B has one end removable similar to the frame A and the auxiliary wind shield 26 is placed in the frame B in substantially the same manner as is the glass 14 of the frame A. The actual installation of my auxiliary wind shield requires the removal of the glass 14 from the frame A and placing the frame B upon the frame A with the channel groove 20 of the frame B received within the channel 12 of the frame A. After the glass 14 has been reinserted within the channel groove 20 which is possible due to the compressibility of the binder 18, it serves to retain the frame B in mounted position upon the frame A. The glass 26 is, of course, placed within the groove 22 and when both wind shields are in operative position then the dead air space or compartment C is formed therebetween.

It will be noted that the entire auxiliary wind shield is carried upon the main frame A by means of the auxiliary frame B. It will also be noted that during certain seasons of the year when a double wind shield is not required, that is during summer months, then the wind shield glass 14 may be removed thereby allowing the auxiliary wind shield and its frame to be removed, from the frame A. The wind shield glass 14 may be reinserted in the frame B thus replacing the double wind shield and providing thereafter a single wind shield.

The device is very practical for automobile use in that it prevents frosting of the wind shield during winter months and tends to maintain a clear wind shield at all times.

Some changes may be made in the details of the construction and arrangement of the various parts of my double wind shield without departing from the real spirit and purpose of my invention, and it is my intention to cover by my claims, any modified forms of structure or use of mechanical equivalents, which may be reasonably included within their scope.

I claim as my invention:

1. The combination with a wind shield frame having a continuous channel groove therein and a glass element received in the groove of said frame, of an auxiliary wind shield device comprising a double channel grooved frame having one of the channel grooves interposed between the channel groove of said first frame and the glass element therein and an auxiliary glass element mounted in the other of said channel grooves of said double channel grooved frame.

2. The combination with a wind shield frame having a continuous channel groove therein and a glass element for said frame, of an auxiliary wind shield attachment for said frame comprising an auxiliary frame having a pair of spaced continuous channel grooves therein, one of said channel grooves being adapted to be received in the channel groove of said first frame and said glass element being received in said last mentioned channel groove whereby said glass element will serve to retain said auxiliary frame relative to said wind shield frame and an auxiliary glass adapted to be received in the other of said channel grooves of said auxiliary frame.

3. The combination with a frame and a wind shield glass mounted therein, of an auxiliary wind shield comprising an auxiliary frame having means of connection adapted to be interposed between said first frame and said wind shield glass whereby said wind shield glass retains said means of connection against movement and means of retaining an auxiliary wind shield glass upon said auxiliary frame in spaced position from said first wind shield glass.

Des Moines, Iowa, August 19, 1927.

WILLIAM NIELSEN.